Figure 1:
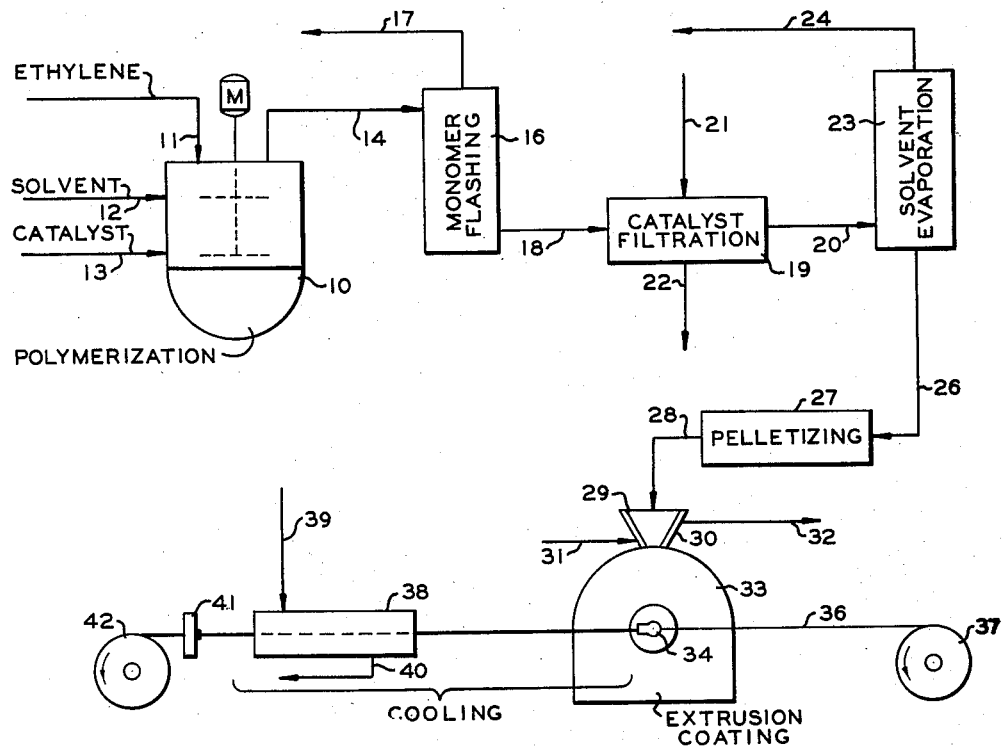

Jan. 13, 1959  R. M. McGLAMERY  2,867,848
HEAT-STRESS CRACKING RESISTANCE OF THERMOPLASTIC
FILAMENTOUS ARTICLES
Filed Nov. 23, 1956

INVENTOR.
R.M. MC GLAMERY

BY *Hudson & Young*

ATTORNEYS

United States Patent Office 2,867,848
Patented Jan. 13, 1959

2,867,848

HEAT-STRESS CRACKING RESISTANCE OF THERMOPLASTIC FILAMENTOUS ARTICLES

Roger M. McGlamery, Bartlesville, Okla., assignor to Phillips Petroleum Company, a corporation of Delaware Application November 23, 1956, Serial No. 623,772

9 Claims. (Cl. 18—47.5)

This invention relates to a method of treating filamentous articles of crystalline ethylene polymers to improve their resistance to heat-stress cracking. In one of its more specific aspects this invention relates to a method of treating such polymeric articles by cold working their surfaces.

Polyethylenes are well recognized as excellent insulating materials for electrical purposes, especially in high-frequency applications. Commercial polymers, prepared under conditions of high temperatures and pressures, however, have a relatively low softening point of about 220 to 223° F., which thereby restricts their use without a protective jacket of some high-softening resin such as nylon. Higher softening ethylene polymers produced catalytically at considerably lower temperatures and pressures show many superior physical properties, but as wire coatings have a tendency to crack or rupture when exposed to conditions of stress at elevated temperatures. This type of failure has been termed "heat-stress cracking," as differentiated from "environmental-stress cracking." While heat-stress cracking can occur in other applications, it is of particular importance in the insulation of electrical wiring which is subjected to elevated temperatures with winding, twisting, and tension, thereby developing considerable stresses in the coating material.

I have discovered that the resistance to heat-stress cracking of filamentous articles formed of crystalline ethylene polymers is considerably improved by cold working the surface of these articles. Such a cold working is carried out by applying pressure at points along the surface of the article in such a manner that there is a resultant net reduction in cross section of the polymeric portion of the article. This is done while the polymer is below its softening temperature. By "filamentous articles" I refer to solid strands or threads of polymer as well as polymeric coatings on wires or the like, which are considered tubular filaments with a core of foreign material. I prefer to perform this cold working by drawing the filamentous article through an orifice or restricted opening and thereby reduce the diameter of the strand or the thickness of the coating, as the case may be. I have found that by carefully controlling the amount of cold working which such a process effects, an insulation can be produced which has outstanding electrical characteristics, dimensional stability, flexibility over a wide temperature range, improved resistance to chemicals, ability to withstand temperatures of 235° F. and above, plus improved resistance to heat-stress cracking.

Figure 2:
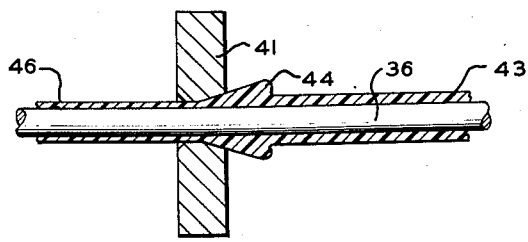

It is an object of my invention to provide a method for producing improved thermoplastic coatings suitable for electrical insulation. It is another object of my invention to overcome the problem of heat-stress cracking in high-density polyethylene coatings while retaining their characteristic of high softening temperature. It is still another object of my invention to provide a method of surface treating high-density ethylene polymers to improve the resistance thereof to heat-stress cracking by cold working their surfaces. Other objects, advantages and features of my invention will become apparent to those skilled in the art from the following detailed description and drawing, in which Figure 1 is a schematic flow diagram of the polymerization and wire coating processes and Figure 2 is a cross section of the coated wire as it passes through the tapered orifice to effect the reduction in the thickness of the coating on the wire.

The value of polyethylene as an electrical insulating material is well recognized. It is light, flexible and has good dielectric properties. It is also easily extruded as a coating upon wires and other products. Improved polyethylene resins have been developed with even better electrical characteriistics plus the ability to withstand higher temperatures with greater rigidity and better resistance to chemical attack. These improved polyethylenes have a density of about 0.94, usually 0.96 and above, and a softening temperature in the range of about 250 to 270° F.

For the practice of my invention this improved polyethylene or a copolymer of a mixture of monomers predominantly ethylene produced by essentially the same methods as those which yield a polyethylene having the required physical properties can be used. In a preferred method of preparing these ethylene polymers for my invention, ethylene is polymerized alone or with one or more monoolefinic comonomers having from three to twelve carbon atoms per molecule, preferably not over four carbon atoms. Usually when the higher molecular weight comonomers of from five to twelve carbon atoms are used, the percentage of these comonomers in the total monomeric material should not exceed 3 weight per cent. Comonomers of three and four carbon atoms per molecule, for example, propylene, 1-butene, and 2-butene, can be employed in larger amounts, up to 30 weight percent of the total monomeric material being allowable. It is preferred, however, in order to realize more benefits from increased softening temperature of the thermoplastic coating, that even these lower molecular weight comonomers comprise not more than 20 and more preferably less than 15 weight percent of the total monomeric material.

Ethylene with or without these comonomers is polymerized in the presence of a catalyst comprising chromium, a portion of which is hexavalent (preferably at least 0.1 percent by weight of the total catalyst) as chromium oxide associated with at least one oxide from the group consisting of silica, alumina, zirconia, and thoria. The total chromium content of the catalyst is preferably between 0.1 and 10 weight percent. Polymerization is ordinarily carried out at a temperature between 150 and 450° F., and the pressure of the reaction can vary over a wide range, for example, from atmospheric pressure to 1,000 pounds per square inch absolute or higher; however, generally this reaction is known as low-pressure polymerization. The reaction can be carried out in a gaseous phase; but when diluent is used the minimum pressure is that necessary to maintain the diluent in a liquid phase. Preferably a solvent is used which is liquid and inert under contacting conditions, such as hydrocarbon solvents, especially naphthenic hydrocarbons and paraffinic hydrocarbons of from 3 to 12 carbon atoms, for example, propane, normal pentane, isopentane, isooctane, cyclohexane and methylcyclohexane. In such cases the reaction pressure is ordinarily in the range of 100 to 800 pounds per square inch absolute.

The effluent withdrawn from the reactor comprises a solution of polymer and solvent, and when slurry or suspended catalyst is used the effluent also contains catalyst. Unreacted monomers are removed by flashing, and the solution with or without the addition of more solvent is filtered, centrifuged or the like to remove the catalyst. The catalyst-free solution is then passed to suitable recovery steps for removal of the solvent, such as by evaporation or flashing; and solid polymer is recovered in these steps or by precipitation. For some applications catalyst can be allowed to remain in the finished polymer, so the catalyst removal step is optional. The solid polymer is ordinarily further processed in order to be placed in condition for storage. Pellets or granules are suitable form and these can be prepared by extruding the polymer into strands which are then cut or chopped in a pelletizer.

Preparation of such polyolefins is more fully described in the co-pending application of Hogan and Banks, Serial No. 573,877, filed on March 26, 1956 now Patent No. 2,825,721.

Copolymers suitable for the practice of my invention as produced by the above described process have a density of at least 0.92 and a softening temperature of at least 235° F. with a melt index of generally not over 20 and preferably in the order of .1 to 5 and below. When the amount of comonomer in the total monomer feed does not exceed 15 weight percent, these copolymers have a density of at least 0.94 and a softening temperature of at least 240° F. The ethylene polymer containing not more than 3 weight percent of other monoolefins has a density of at least 0.94, a softening temperature of about 260° F. and a crystallinity of not less than 80 percent at 25° C. as determined by nuclear magnetic resonance.

While the above described process is the preferred manner for preparing the polymers for my invention, any process which will yield a polymer or copolymer having the required physical characteristics is satisfactory. For example, another suitable method is a low temperature, low pressure process in which the polymerization is effected in the presence of catalyst systems which preferably comprise an organometal derivative as one component. Such catalyst compositions can have two or more components, one component being an organometal compound, metal hydride, or a group I, II or III metal and the other compent being a compound of a group IV to VI metal. With certain of the above two-component systems, an organic halide having 30 or less carbon atoms per molecule or a metal halide can be used advantageously as a third catalyst component. Specific examples of suitable catalyst systems are triethylaluminum and titanium tetrachloride, mixtures of ethylaluminum halides and titanium tetrachloride, titanium tetrachloride and sodium or magnesium, and titanium tetrachloride with lithium aluminum hydride and ethyl bromide.

"Softening temperature" as applied to these thermoplastic polymers and used in this specification refers to the ability of a particular polymer to support a standard load or withstand a force at elevated temperatures without substantial deformation. "Softness" of a polymer is a measure of its relative deformation under a standard load for a certain time interval at a particular temperature. The method for determining softness as used in this specification is that described by the article of Karrer, Davis and Dieterich in Industrial and Engineering Chemistry (Analytical Edition), 2, 96 (1930). The softening temperature for a polymer is determined by plotting softness over a range of temperatures with temperature on the abscissa. As softness increases with temperature, the slope of the curve formed by the plot likewise increases, and the temperature at which the slope of the curve equals the tangent of 60° is, by definition, the softening temperature.

Wire is coated with the ethylene polymer or copolymer by techniques well known in the art. A preferred method of wire coating is by means of a standard plastics extruder fitted with a wire-coating cross-head through which the wire to be coated passes. In such an apparatus, the polymer is maintained at a temperature sufficiently high to keep it fluid, and as pressure is exerted by the screw in the extruder, the wire emerges coated with a continuous sheath of plastic. Another method of applying insulant to a conductor is by sandwiching the wire between two strips of calendered polymer ribbon and shaping the plastic around the wire with a pair of grooved steel rollers. Coating can also be applied by fusing a helical winding of calendered polymer film into a continuous coating upon the wire. In all of these coating operations, the polymer is worked while at a temperature considerably above its softening point.

It is important that the coating be cooled uniformly so that the surface material does not become rigid while the interior remains fluid. This results in the production of voids at the polymer-wire interface; and when the wire is used in electrical applications, such voids become points of ionization subjecting the polymer composition to degradation and break-down in dielectric strength. To achieve this uniform coating and avoid uneven density changes within the coating, it is preferred that the coatings be gradually cooled from the extrusion or working temperature to a temperature below their melting or softening temperatures. A thin coating such as would be applied to small wires can be passed directly into cooling water since a uniform cooling for such a film can be effected fairly rapidly. However if the coatings are fairly thick, as for example about 0.05 inch, they should be cooled gradually in order to insure an even cooling within the film. It is most important to avoid a quenching effect for such coatings. Slow cooling provides a further advantage by producing greater rigidity in the polymers used for my invention.

After the polymer has been formed into strands or threads or coated upon wires or filaments where it serves as a protective coating or insulating material, it is further processed according to my invention by cold working in such a manner as to produce an over-all reduction in the diameter of the strand or in the thickness of the coating on the wire.

Cold working which produces the effects desired is an application of pressure at various points on the surface of the polymeric article or coating while the polymer is at a temperature below its softening temperature. This is preferably a temperature at least about 10 or 15° below the softening temperature of the polymer. For example, ethylene polymer having a softening temperature of about 250° F. and above, should be cooled and worked while at a temperature below about 235° F. for maximum benefits to be derived from the practice of my invention. There is no lower limit on the temperature at which this working should be done other than that directed by practical considerations. There is apparently no advantage in using a temperature below room temperature.

Pressure can be applied to the surface of the polymer by any one of several possible methods as, for example, by rolling the strand or fiber or coated filament between two heavy metal plates, or by hammering the surface of the polymer; however, my preferred method of applying this pressure is by drawing the strand or coated filament through a restricted opening in such a manner that the diameter of the strand or the thickness of the coating on the wire or filament is reduced. This restricted opening can have a number of different forms, as long as it accomplishes the desired purpose of applying even circumferential pressure to the polymer and thereby reducing its cross-sectional area. An orifice or die is a practical instrument for this purpose. The orifice is preferably tapered in order to avoid cutting the surface of the polymer or stripping the coating from the wire.

The amount of cold working which is desired for any polymer would depend considerably upon the application of the polymer and its required resistance against heat-stress cracking. Generally, the more severe the cold working process, the better resistance the polymer will have to heat-stress cracking. This seems to be true up to a point, beyond which increased improvement is not apparent.

The physical change in the polymer required to increase its resistance to heat-stress cracking is not fully understood; however, it has been found that ordinarily the polymer when processed as described above will undergo a reduction in density which is slight but measurable. It has been found that to process the polymeric article in the manner above described so that the polymer undergoes a decrease in density will produce an increase in its heat stress cracking resistance.

I have found that the manner of measuring and expressing the amount of cold working required to produce the desired effects in preferred embodiments or my invention can best be done by referring to the amount of reduction in the cross-sectional area of the polymer itself, either in the form of a strand, fiber or filament or as a coating on another filament such as a wire. When the polymer is solid, that is, when it is in the form of a strand or fiber, the amount of cold working can be expressed as a percentage reduction in diameter. When the polymer is a coating upon another filament, such as a wire, the amount of cold working is best expressed as a reduction in thickness of the coating itself. Ordinarily, when a wire is coated, the article will be generally cylindrical in shape and the thickness of the polymer coating can be readily determined when the diameter of the wire or core is known.

I have observed that heat-stress cracking of a coating such as described above originates in the form of tiny cracks on the surface of the coating. These cracks later develop into larger ruptures which may pass clear to the core. Since this phenomenon originates as a surface condition, some benefit can be gained by the process of my invention where only the surface is worked, although ordinarily, the effects of my process extend throughout the body of the polymer. However, it is apparent that as the thickness of the coating increases, a lower percentage reduction in the total coating thickness is required to produce beneficial results in heat-stress cracking resistance. Thus, while a small percentage reduction of a relatively thin coating will produce a correspondingly small improvement in heat-stress cracking resistance, the same percentage reduction for a coating of greater thickness will produce a somewhat greater improvement, although not proportionally so.

I have found that beneficial results can be achieved through the practice of my invention by cold drawing a filament of ethylene polymer so that the over-all diameter of the filament is reduced by at least about 15 percent. This, of course, would apply to solid polymer strands or filaments without the central core of foreign material. Expressed as applied to the coating of polymer alone, the beneficial results can be realized by reducing the thickness of the polymeric coating by at least about 15 percent. Expressed in this manner, as can be readily seen, the amount of cold working required is independent of the size of the central core which is as it should be, since the cold working affects the coating only and not the core. Thus, as the core or wire becomes smaller in relation to the coating a point is reached where the thickness of the coating becomes the radius of a solid polymeric strand. A percentage reduction in radius is the same percentage reduction in diameter.

For increased benefit to be derived from the process of my invention, it is preferred that the amount of cold working upon the polymer result in at least about 30 percent reduction in the diameter of the solid strand or in the thickness of the coating on a wire or core. The amount of cold working can be increased considerably over these minimum figures and optimum reduction would be determined to a large extend upon other processing conditions, such as the desired thickness of the insulating coating on the final article. Generally, reductions in coating thickness above about 90 percent would not be practicable and in many cases rather than reduce the thickness of the coating more than about 60 percent, it would be preferable to begin the processing with a smaller initial coating and draw down a lesser percentage.

To further describe my invention reference is now made to the drawing of Figure 1 in which polymerization is conducted in reactor 10 while feeding thereto ethylene, solvent and catalyst through lines 11, 12 and 13, respectively. Reactor effluent is removed continuously through line 14 to monomer flashing zone 16 wherein unreacted ethylene is removed through line 17 and returned to the reaction. A solution of polyethylene in solvent with catalyst in suspension passes through line 18 to filter 19 where catalyst is removed. Catalyst-free solution leaves through line 20 while fresh solvent can be introduced through line 21 to flush catalyst from the filters through line 22 in a cyclic operation. Solvent is removed from the solution in a series of evaporation steps represented by evaporator 23, solvent passes overhead through line 24 while polyethylene passes by conduit 26 to pelletizer 27. Particles of solid polyethylene are conveyed by conduit 28 to hopper 29 having jacket 30 heated with superheated steam entering the jacket through line 31 and leaving through line 32. The polyethylene is heated to a fluid condition and passes to extruder 33 from which it is extruded as a coating on a wire passing through extrusion crosshead 34. Wire 36 is fed continuously through the crosshead 34 from spool 37. The polyethylene coating on the wire as it leaves the extruder is cooled uniformly in an air space before entering trough 38 wherein the polymer is further cooled to a temperature below its softening temperature by a countercurrent flow of water entering the trough through line 39 and leaving through line 40. The coated wire then passes through orifice 41 where the coating is substantially reduced in thickness by cold drawing, and the coated wire is wound on spool 42. As shown in Figure 2, coated wire 43 is drawn through orifice plate 41 and the polymer coating is subjected to severe cold working by substantially reducing the thickness of the coating. Excess polymer 44 can be trimmed mechanically or by hand. The final product is a coated wire 46 which has a coating with improved resistance to heat stress cracking.

While the process of my invention can be advantageously applied to improve heat-stress cracking resistance in a number of different types of polymeric articles such as strands, fibers, threads and the like, it was in the field of electrical wire insulation that this problem was first recognized and therefore it is in this area that my invention has one of its most useful applications. It is for this reason that the discussion and examples presented in this specification have centered about wire insulation and coating; and these specific embodiments should not be interpreted as limiting my invention to this field alone.

EXAMPLES

*Example 1*

Ethylene was polymerized in a continuous process using a 20 gallon reactor provided with a stirrer. Polymerization was effected in the presence of a chromia-silica-alumina catalyst containing 2.46 weight percent chromium as chromium oxide. A cyclohexane solvent was charged at the rate of 61 pounds per hour, ethylene was charged at the rate of 9.5 pounds per hour. Reaction temperature was 280° F. and pressure was 420 pounds per square inch gauge. Following separation of the solvent and catalyst, a polymer having the following properties was recovered:

| | |
|---|---|
| Volatiles, weight percent | 0.02 |
| Ash, weight percent | 0.04 |
| Bulk density, pounds per cubic foot | 15.6 |
| Melt index [1] | 0.56 |
| Crystallinity at 25° C. percent [2] | >92 |
| Density, grams per cubic centimeter | 0.95±.01 |
| Softening temperature, °F.[3] | 258±2 |

[1] ASTM D1238–52T.
[2] As determined by nuclear magnetic resonance.
[3] Determined as described in the discussion above.

A No. 14 copper wire was coated with the ethylene polymer by extruding the molten polymer onto the wire. It was then cooled to approximately 77° F. at a slow enough rate to give void free adhesion to the wire. The diameter of the coated wire was 0.125 inch. The wire was tested by wrapping it around its own diameter and subjecting it to a temperature of about 250° F. After about 40 minutes several cracks appeared in the sample. A second sample tested at 221° F. developed cracks in less than 3 hours. This test is considered much more severe than actual field conditions, and, therefore, presents a useful means of comparing benefits to be derived by the various processes for improvement in resistance to heat-stress cracking.

*Example II*

Ethylene was polymerized in two continuous runs which were made simultaneously, one in a 60-gallon reactor and the other in a 20-gallon reactor; and the products were blended. Each reactor was provided with a stirrer. Reaction conditions were as follows:

| | 60-Gallon Reactor | 20-Gallon Reactor |
|---|---|---|
| Temperature, ° F | 279 | 277 |
| Pressure, pounds per square inch gage | 420 | 420 |
| Catalyst concentration in reactor, weight percent | 0.4 | 0.45 |
| Polymer concentration in reactor weight percent | 9.0 | 8.7 |
| Chromium (as chromium oxide) in catalyst, weight percent | 2.5 | 2.5 |
| Cyclohexane feed rate, pounds per hour | 121 | 61 |
| Ethylene feed rate, standard cubic feet per hour | 272 | 130 |
| Residence time, hours | 2.9 | 1.7 |

Following separation of solvent and catalyst, a polymer was recovered which had the following properties:

| | |
|---|---|
| Volatiles, weight percent | 0.000 |
| Ash, weight percent | 0.003 |
| Crystalline freezing point, ° F.[1] | 252±2 |
| Density | 0.961 |
| Melt Index [2] | 0.582 |
| Injection molded [3] | |
|   Tensile, pounds per square inch | 4595 |
|   Elongation, percent | 59 |
| Compression molded [4] | |
|   Tensile, pounds per square inch | 4541 |
|   Elongation, percent | 20 |
| Impact strength, Izod, foot pounds per inch notch [5] | 4.3 |
| Heat distortion ° F [6] | 182 |
| Stiffness, pounds per square inch [7] | 154,000 |
| Softening temperature, ° F.[8] about | 260±2 |
| Crystallinity, at 25° C., percent [9] above | 92 |

[1] Frequently designated as melting point; determined on a cooling curve.
[2] ASTM D1238-52T.
[3] ASTM D638-52T.
[4] ASTM D412-51T.
[5] ASTM D256-47T.
[6] ASTM D648-45T.
[7] ASTM D747-50.
[8] Determined as described in the discussion above.
[9] As determined by nuclear magnetic resonance.

A No. 14 copper wire (0.064 inch in diameter) was coated with ethylene polymer by extruding the molten polymer onto the wire. It was then cooled to about room temperature at a rate sufficiently slow to give void-free adhesion of the polymer to the wire. The wire was then divided into several samples which were drawn at various temperatures and drawing rates through a tapered die having a temperature regulating control. Each sample was measured to determine its initial and final diameters from which the initial and final thickness of the coating were calculated. Each sample was tested by wrapping it around its own diameter and subjecting it to a temperature of 232° F. and the time for surface cracks to appear was noted. The results of these runs are shown in Table I:

TABLE I.—DRAWING POLYETHYLENE-INSULATED WIRE

[Diameter of wire: 0.064 inch.]

A. Drawing Temperature: 200° F. Drawing Rate: 10 inches per minute

| Initial State | | Final State | | Percent Reduction in Coating Thickness | Time to Crack at 232° F. (Hours) |
|---|---|---|---|---|---|
| Diameter (Inches) | Coating Thickness (Inches) | Diameter (Inches) | Coating Thickness (Inches) | | |
| 0.150 | 0.043 | 0.142 | 0.039 | 9.3 | [1] 0-2 |
| 0.120 | 0.028 | 0.112 | 0.024 | 14.3 | [1] 5-7 |
| 0.140 | 0.038 | 0.128 | 0.032 | 15.8 | [1] 0-2 |
| 0.138 | 0.037 | 0.080 | 0.008 | 78.3 | >175 |
| 0.143 | 0.0395 | 0.090 | 0.013 | 41.7 | >175 |

B. Drawing Temperature: 150° F. Drawing Rate: 10 inches per minute

| 0.155 | 0.0455 | 0.126 | 0.031 | 31.9 | [1] 7-34 |
| 0.152 | 0.044 | 0.103 | 0.0195 | 55.7 | >175 |
| 0.129 | 0.0325 | 0.090 | 0.013 | 60.0 | >175 |

C. Drawing Temperature: 80° F. Drawing Rate: 10 inches per minute

| 0.145 | 0.0405 | 0.125 | 0.0305 | 24.7 | [1] 0-2 |
| 0.145 | 0.0405 | 0.110 | 0.023 | 43.2 | >175 |
| 0.139 | 0.0375 | 0.093 | 0.0145 | 61.3 | >175 |

D. Drawing Temperature: 80° F. Drawing Rate 20 inches per minute

| 0.120 | 0.028 | 0.110 | 0.023 | 17.9 | [1] 5-7 |
| 0.150 | 0.043 | 0.110 | 0.023 | 46.5 | [1] 34-103 |

E. Drawing Temperature: 80° F. Drawing Rate: 5 inches per minute

| 0.126 | 0.031 | 0.110 | 0.023 | 25.8 | [1] 5-7 |
| 0.140 | 0.038 | 0.110 | 0.023 | 39.5 | [1] 34-103 |

[1] Cracks appeared sometime during the time interval stated.

The data in the above table indicates that the temperature and rate of drawing are not critical from the standpoint of improvement in heat-stress cracking resistance as long as the working is done at a temperature below the softening temperature of the polymer and the drawing rate is sufficiently slow that the polymer coating is not damaged or stripped from the wire. It is further apparent from the above data that beneficial results can be realized by such a cold drawing process when the amount of such working results in a reduction in the coating thickness of at least about 15 percent. When the thickness of the coating was reduced above about 30 percent, the improvement in resistance to heat-stress cracking became suddenly quite marked for most of the samples, extending the useful life of the coating beyond the maximum time employed for the runs, i. e., greater than 175 hours.

*Example III*

A sample of the wire coated polymer described in Example II was not drawn through a die, but was subjected to a cold working by hammering the wire circumferentially. This sample was subjected to the same conditions of stress as those described in Example II. Time for surface cracks to appear was prolonged until some time during the period of 15 to 24 hours, thus showing such a cold working process has a positive effect.

I claim:

1. A method of imparting heat-stress cracking resistance to a filamentous article of crystalline ethylene polymer which is a polymerizate of a monomer system comprising from 70 to 100 weight percent ethylene, from 0 to 30 weight percent monoolefin selected from the group consisting of propylene, 1-butene, 2-butene and mixtures thereof, and from 0 to 3 weight percent acyclic monoolefin having from 5 to 12 carbon atoms per molecule, said polymer being characterized by a crystallinity at 25° C. of at least 80 percent, a density of at least 0.94 grams per cubic centimeter, and a softening temperature of at least 240° F. which comprises applying sufficient circumferential pressure to the surface of said article at a temperature below the softening point of said polymer to effect a reduction in density of said polymer.

2. A method of imparting heat-stress cracking resistance to a filamentous article of crystalline ethylene polymer which is a polymerizate of a monomer system comprising from 70 to 100 weight percent ethylene, from 0 to 30 weight percent monoolefin selected from the group consisting of propylene, 1-butene, 2-butene and mixtures thereof, and from 0 to 3 weight percent acyclic monoolefin having from 5 to 12 carbon atoms per molecule, said polymer being characterized by a crystallinity at 25° C. of at least 80 percent, a density of at least 0.94 grams per cubic centimeter and a softening temperature of at least 240° F. which comprises passing said article through an orifice at a temperature below the softening temperature of said polymer so as to effect a reduction in the over-all diameter of said article and a reduction in the density of said polymer.

3. A method of improving the heat-stress cracking resistance of a cylindrical filamentous article of crystalline ethylene polymer which is a polymerizate of a monomer system comprising from 70 to 100 weight percent ethylene, from 0 to 30 weight percent monoolefin selected from the group consisting of propylene, 1-butene, 2-butene and mixtures thereof, and from 0 to 3 weight percent acyclic monoolefin having from 5 to 12 carbon atoms per molecule, said polymer being characterized by a density of at least 0.94 grams per cubic centimeter, a softening temperature of at least 250° F., and a crystallinity of not less than 80 percent at 25° C., which comprises drawing said filamentous article through a tapered circular orifice having an opening of lesser diameter than said article at a temperature below the softening temperature of said polymer, thereby effecting an over-all reduction in diameter of said article of at least about 15 percent.

4. A method of improving the heat-stress cracking resistance of a thermoplastic coating on a filamentous article, said coating being formed of crystalline ethylene polymer which is a polymerizate of a monomer system comprising from 70 to 100 weight percent ethylene, from 0 to 30 weight percent monoolefin selected from the group consisting of propylene, 1-butene, 2-butene and mixtures thereof, and from 0 to 3 weight percent acyclic monoolefin having from 5 to 12 carbon atoms per molecule, said polymer being characterized by a density of at least 0.94 grams per cubic centimeter, a softening temperature of at least about 250° F., and a crystallinity not less than 80 percent at 25° C., which comprises drawing said filamentous article through a die at a temperature below the softening temperature of said polymer so that said coating is reduced in thickness by at least about 15 percent.

5. A method of producing an electrical wire insulation having improved resistance to heat-stress cracking which comprises applying polymer which is a polymerizate of a monomer system comprising from 70 to 100 weight percent ethylene, from 0 to 30 weight percent monoolefin selected from the group consisting of propylene, 1-butene, 2-butene and mixtures thereof, and from 0 to 3 weight percent acyclic monoolefin having from 5 to 12 carbon atoms per molecule, said polymer being characterized by a crystallinity of 25° C. of at least 80 percent, a density of at least 0.92 grams per cubic centimeter, a melt index of not over 5, and a softening temperature of at least 235° F., while above its softening temperature to a wire forming a protective coating thereon, uniformly cooling said coating below the softening temperature of said polymer and thereafter passing said wire through a tapered orifice having a diameter less than said wire plus the coating but greater than the diameter of said wire, so as to effect a reduction in the thickness of said coating of at least about 15 percent.

6. A method of providing an improved thermoplastic coating for electrical wiring, said coating having good resistance to heat-stress cracking plus excellent thermal stability which comprises applying a polymer which is a polymerizate of a monomer system comprising from 85 to 100 weight percent ethylene and from 0 to 15 weight percent of monoolefin selected from the group consisting of propylene, 1-butene, 2-butane and mixtures thereof, said polymer being characterized by a crystallinity at 25° C. of at least 80 percent, a density of at least 0.94 grams per cubic centimeter and a softening temperature of at least 240° F., while above its softening temperature to a wire forming a protective coating thereon, uniformly cooling said coating below the softening temperature of said polymer, and drawing said wire through a tapered orifice having a diameter such that the thickness of said coating is reduced thereby by at least about 30 percent.

7. A method of providing an improved thermoplastic coating for electrical wiring, said coating having good resistance to heat-stress cracking plus excellent thermal stability which comprises extruding a polymer which is a polymerizate of a monomer system comprising ethylene with less than 3 weight percent of the total monomeric material as acyclic monoolefin having from 3 to 12 carbon atoms per molecule, said polymer being characterized by a density of at least 0.94 gram per cubic centimeter, a softening temperature of at least 250° F., and a crystallinity at 25° C. of at least 80 percent, while above its softening temperature onto a wire forming a continuous protective coating thereon, cooling said coating uniformly to a temperature below about 235° F., and thereafter drawing said wire thus coated through a tapered restricted opening so as to reduce the thickness of said coating from about 30 to 90 percent.

8. A method according to claim 7 wherein said polymer is polyethylene polymerized in the presence of a chromium oxide-containing catalyst and characterized by a density of at least about 0.96 grams per cubic centimeter.

9. A method according to claim 1 wherein said circumferential pressure is applied by hammering the surface of said article.

References Cited in the file of this patent
UNITED STATES PATENTS

| | | |
|---|---|---|
| 2,286,759 | Patrode | June 16, 1942 |
| 2,346,208 | Conaway | Apr. 11, 1944 |
| 2,452,884 | Werner | Nov. 2, 1948 |
| 2,728,951 | O'Hanlon et al. | Jan. 3, 1956 |
| 2,770,014 | Nordlin et al. | Nov. 13, 1956 |